UNITED STATES PATENT OFFICE 2,673,885

PROCESS FOR THE PURIFICATION OF ACETYLENE

Helmut Müller, Brilon-Wald, Germany, assignor to Deutsche Gold- und Silber-Scheideanstalt vormals Roessler, Frankfurt am Main, Germany, a corporation of Germany No Drawing. Application January 10, 1952, Serial No. 265,919

Claims priority, application Germany January 19, 1951

8 Claims. (Cl. 260—679)

The present invention relates to a novel process for the purification of acetylene, particularly acetylene containing phosphine as an impurity.

Technical acetylene such as, for example, is obtained by the decomposition of carbides, usually contains substantial quantities of impurities, particularly, phosphine. Such impurities are disturbing in many uses of acetylene and must consequently be removed therefrom. Generally the purification is accomplished by treating the impure acetylene with oxidizing substances which essentially oxidize the impurities, but do not substantially affect the acetylene. Solid purifying substances of varied character have been suggested for this purpose, but none has been found very practical. The use of purifying substances which are solid has certain drawbacks in large-scale operations, particularly as the space requirements for the cleaning equipment are large and the introduction, removal and regeneration of the purifying substances entails considerable work. Consequently, the art has turned to the use of oxidizing solutions for the purification of acetylene in gas washing equipment. Solutions of sodium and calcium hypochlorite have been found particularly suitable for this purpose. However, the residual salt-containing solutions obtained from such gas washing operations must be rendered harmless and this in many instances leads to complications.

In accordance with the invention it has been unexpectedly discovered that acetylene can be purified more intensively and economically than with the previously known processes by treating the gas in a gas washing apparatus employing chlorine water as the washing medium. Chlorine is the cheapest oxidizing agent for this purpose and has already been proposed for purifying gases, particularly hydrogen. It is, however, known that chlorine as well as saturated chlorine water react very violently with acetylene, often with explosive violence and that acetylene spontaneously ignites upon contact with saturated chlorine water. Naturally not only the impurities would be attacked, but also the acetylene with the formation of corresponding chlorine derivatives. In view of the expected losses of acetylene, as well as the danger of explosion, no one has suggested the use of chlorine water as a purifying agent for acetylene upon a large commercial scale.

It was unexpectedly discovered according to the invention, that chlorine water can be employed in the purification of acetylene with an extraordinarily good cleaning effect and without any danger of explosions, if a stream of chlorine water is contacted with a stream of acetylene in a gas washer in concurrent flow relationship, and if the fresh chlorine water supplied to the gas washer is sufficiently diluted, preferably with recycled spent washing solution. Preferably the chlorine water supplied to the washing apparatus contains about 0.3–1 gram of chlorine per liter. The concurrent flow of the dilute chlorine water solution and the gas stream has been found particularly advantageous, as in this way a reaction between the chlorine and acetylene is substantially avoided and the danger of explosions is completely avoided. Contrary to expectations, however, the impurities are substantially completely removed from the acetylene.

In order to provide the proper chlorine concentration in the washing fluid supplied to the gas washer, it has been found practical to recycle a portion of the spent washing liquid to the fresh chlorine water to dilute it to the proper concentration.

It has been found that exceptionally good purification can be achieved when the quantity of dilute chlorine water supplied to the gas washer is such that an excess of about 30 to 100% of the theoretical quantity of chlorine required is contained therein. The oxidation of phosphine with chlorine water is illustrated by the following equation:

$$PH_3 + 4Cl_2 + 4H_2O = H_3PO_4 + 8HCl$$

The following example will serve to illustrate the manner in which the process according to the invention can be carried out.

Example 100 cubic meters per hour of a commercial acetylene gas obtained by the decomposition of carbides and containing about 500 milligrams of phosphine per cubic meter was passed through a gas washer and washed with chlorine water containing 0.08% of chlorine. The flow of the acetylene washed and the chlorine water in the gas washer was concurrent and the quantity of chlorine water introduced into the gas washer was sufficient to provide 8 grams of chlorine per cubic meter of acetylene treated. As the theoretical quantity of chlorine required to convert the phosphine contained in the acetylene was only 4.3 grams per cubic meter of acetylene, the amount employed was 186% of the theoretical. The washed acetylene only contained less than 1 milligram of phosphine per cubic meter.

The resulting washed acetylene was then washed with a dilute caustic soda solution whereby any chlorine or chlorine water entrained was removed and it was then passed through active carbon to remove any minute traces of chlorinated hydrocarbons which may have been formed.

The apparatus employed was light impervious so no light could reach the acetylene at any point in the process during which it was in contact with chlorine or chlorine water.

Other alkaline solutions can be employed in place of the dilute caustic soda solution for the removal of any entrained chlorine or chlorine water from the washed acetylene. The use of light impervious apparatus has been found preferable, as it substantially prevents any reaction between chlorine or chlorine water with the acetylene.

I claim:

1. A process for the purification of acetylene containing phosphine as an impurity which comprises washing a stream of such acetylene with a concurrent stream of dilute chlorine water as a washing liquid.

2. A process for the purification of acetylene containing phosphine as an impurity which comprises washing a stream of such acetylene with a concurrent stream of dilute chlorine water as a washing liquid, the chlorine concentration of which is adjusted to 0.3 to 1 gram per liter before contact with the acetylene.

3. A process according to claim 2 in which a portion of the spent washing liquid is recycled and employed to adjust the chlorine concentration of the chlorine water.

4. A process according to claim 2 in which the quantity of chlorine in the chlorine water is in excess of the theoretical quantity required to oxidize the phosphine contained in the acetylene being washed to phosphoric acid.

5. A process according to claim 2 in which the quantity of chlorine in the chlorine water is 30 to 100% greater than the theoretical quantity required to oxidize the phosphine contained in the acetylene being washed to phosphoric acid.

6. A process according to claim 2, comprising in addition washing the acetylene after the chlorine water wash with an aqueous alkaline solution to remove any entrained chlorine and chlorine water contained therein.

7. A process according to claim 6 comprising in addition passing the washed acetylene through active carbon to remove any chlorinated products contained therein.

8. A process according to claim 2, in which the acetylene is maintained out of contact with light while it is in contact with chlorine.

HELMUT MÜLLER.

References Cited in the file of this patent

UNITED STATES PATENTS

| Number | Name | Date |
|---|---|---|
| 1,894,763 | Eisenhut et al. | Jan. 17, 1933 |
| 2,013,996 | Baumann et al. | Sept. 10, 1935 |
| 2,407,332 | Wearn et al. | Sept. 10, 1946 |

OTHER REFERENCES

Jour. Chem. Soc. Ind. (Japan), vol. 33, July to December 1930, pages 527B to 529B (article by Sumiya et al.).

Richter's Organic Chemistry, vol. 1 (Allott), page 109, published by Elsevier Publ. Co., distributed by Nordeman Publ. Co., New York, N. Y. Third Edition, American Photo Offset Reprint, 1944.